United States Patent [19]
Rowley

[11] Patent Number: 5,861,200
[45] Date of Patent: *Jan. 19, 1999

[54] THIN WALL COPPER SLEEVE FOR ALL PLASTIC CONDUIT

[76] Inventor: William Rowley, 35 Wilding Chase, Chagrin Falls, Ohio

[ * ] Notice: The term of this patent shall not extend beyond the expiration date of Pat. No. 5,622,670.

[21] Appl. No.: 726,317

[22] Filed: Oct. 3, 1996

Related U.S. Application Data

[63] Continuation-in-part of Ser. No. 588,713, Jan. 19, 1996, Pat. No. 5,622,670, which is a continuation-in-part of Ser. No. 327,028, Oct. 21, 1994, Pat. No. 5,527,503, which is a continuation-in-part of Ser. No. 62,848, May 14, 1993, abandoned.

[51] Int. Cl.$^6$ .................................................. B29D 22/00
[52] U.S. Cl. ................. 428/36.9; 428/35.8; 428/36.91; 264/322; 264/296; 29/890.144; 138/137; 138/140
[58] Field of Search ................................. 428/35.8, 36.9, 428/36.91; 264/322, 296; 29/890.144; 138/137, 140

[56] References Cited

U.S. PATENT DOCUMENTS

| | | | |
|---|---|---|---|
| 4,039,212 | 8/1977 | Skarud | 285/253 |
| 4,140,739 | 2/1979 | Cotten | 264/138 |
| 4,264,490 | 4/1981 | Berejka | 260/45.85 |
| 4,271,218 | 6/1981 | Heckel | 428/36 |
| 4,316,870 | 2/1982 | Rowley | 264/296 |
| 4,342,800 | 8/1982 | Changani et al. | 428/36 |
| 4,343,864 | 8/1982 | Berejka | 428/500 |
| 4,446,084 | 5/1984 | Rowley | 264/40.6 |
| 4,525,136 | 6/1985 | Rowley | 425/384 |
| 4,614,208 | 9/1986 | Skarelius | 138/103 |
| 4,783,303 | 11/1988 | Imgram | 264/535 |
| 5,527,503 | 6/1996 | Rowley | 264/296 |
| 5,622,670 | 4/1997 | Rowley | 264/494 |

FOREIGN PATENT DOCUMENTS

| | | | |
|---|---|---|---|
| 033857 | 8/1981 | European Pat. Off. | B29F 3/00 |
| 84 01988 | 5/1985 | WIPO | F16L 9/12 |
| 85 03251 | 8/1985 | WIPO | B29C 61/08 |

*Primary Examiner*—Janis L. Dote
*Assistant Examiner*—Steven H. VerSteeg
*Attorney, Agent, or Firm*—Oldham & Oldham Co., LPA

[57] ABSTRACT

A unitary molded crosslinked polyethylene tubular connector in a metallic sleeve and method for forming the connector with various end configurations (e.g., molded, belled) is described. The process combines the ease of thermoplastic processing combined with the desirable physical properties of a thermoset. The connector is suitable as a replacement for copper tubes with associated fittings as well as polybutylene tubing.

44 Claims, 9 Drawing Sheets

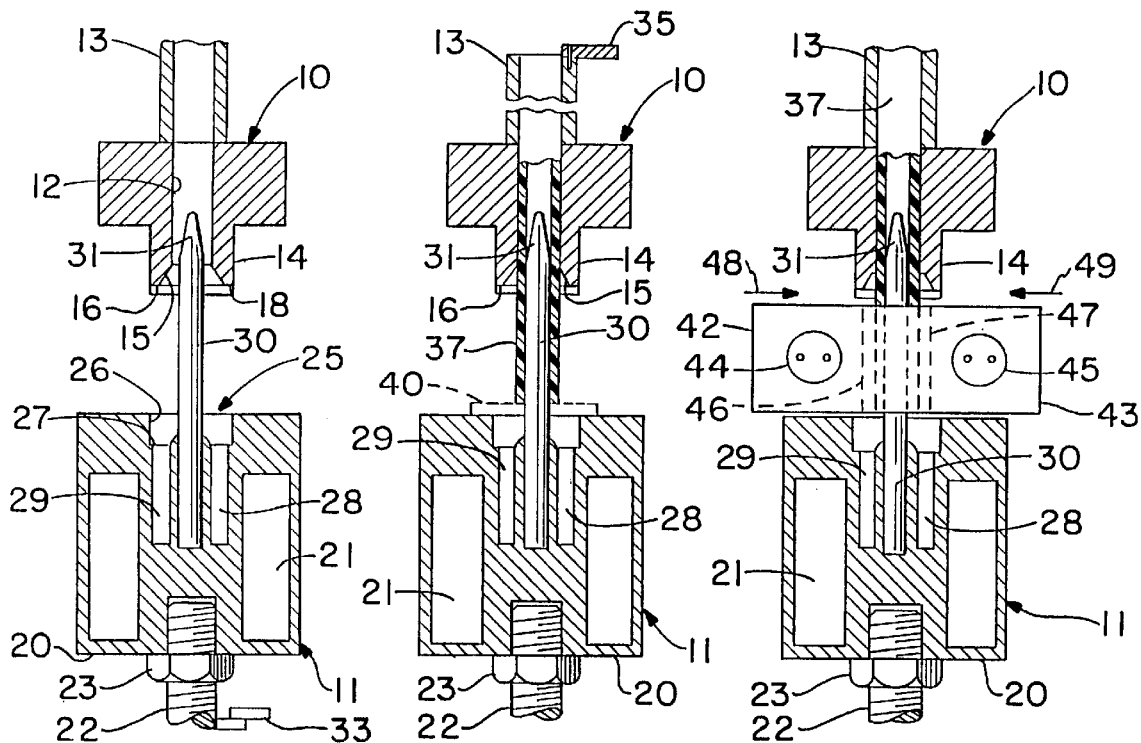
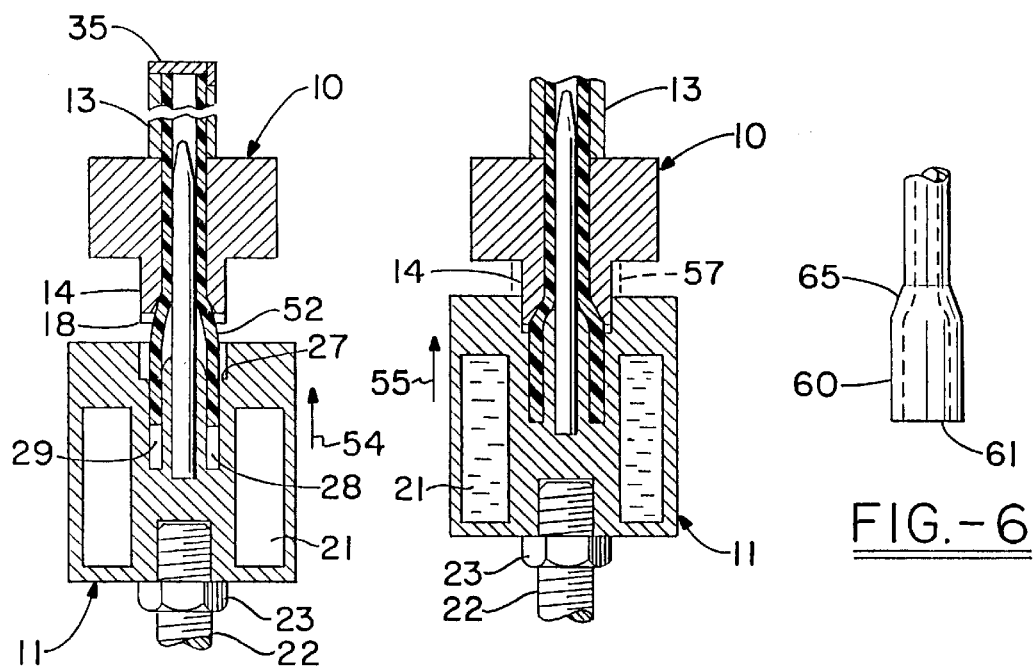

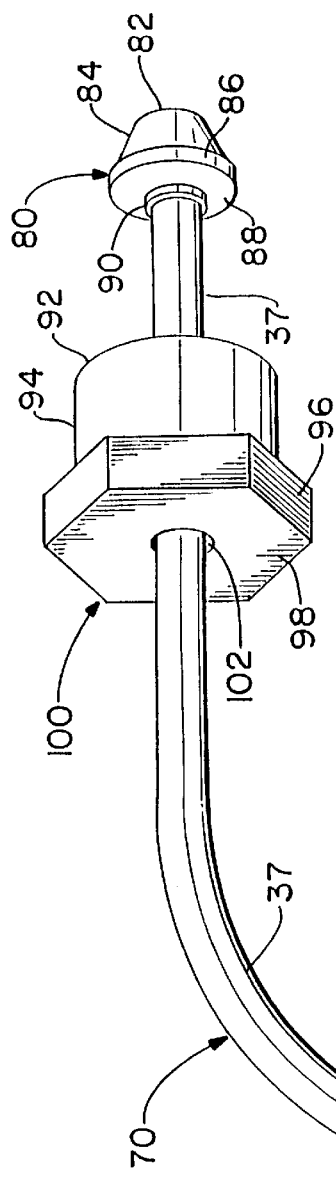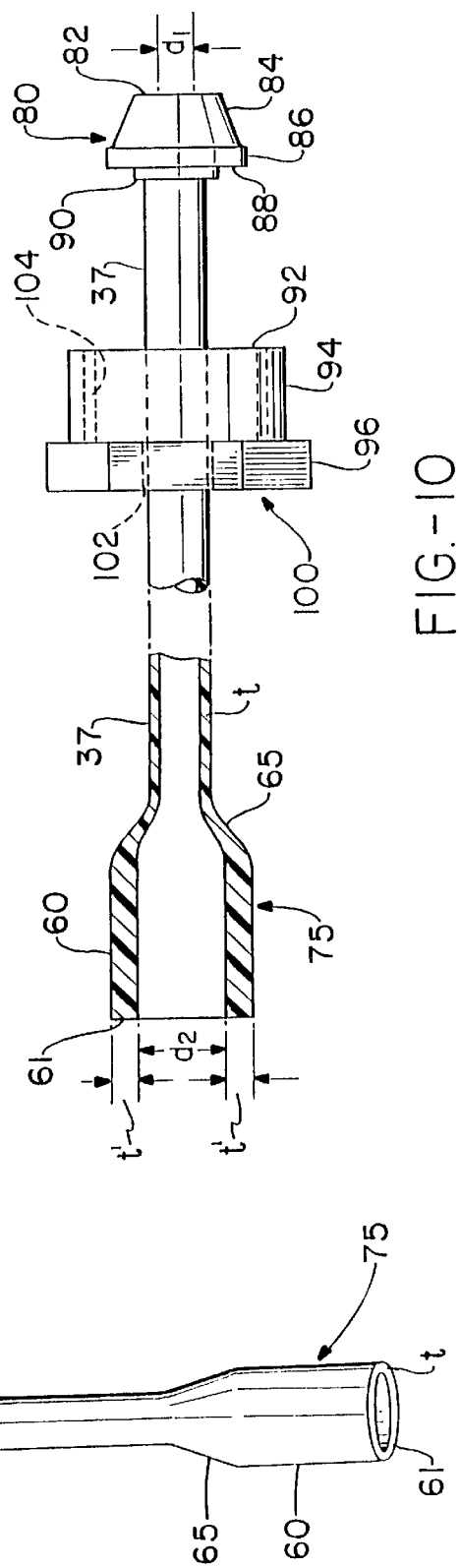
FIG.-9
FIG.-10

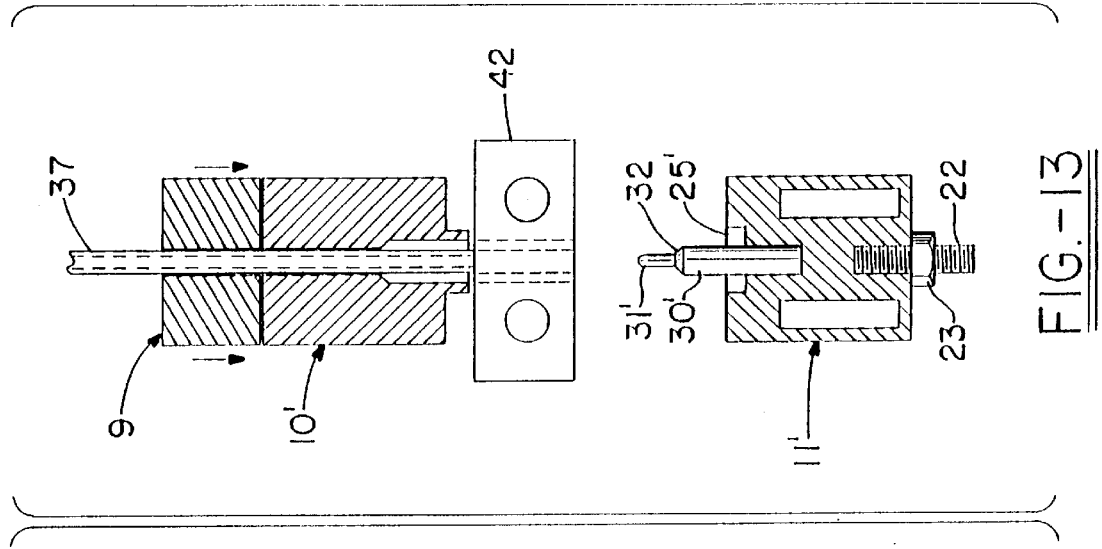
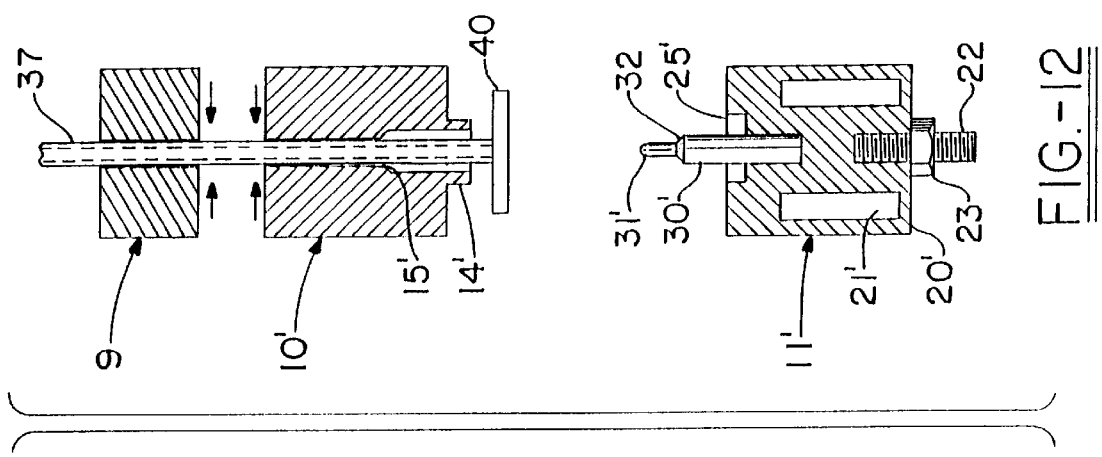
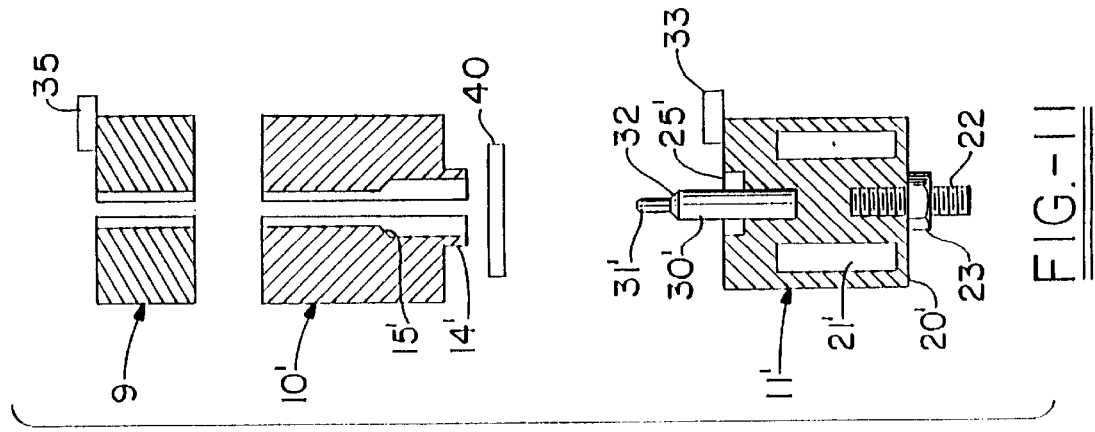

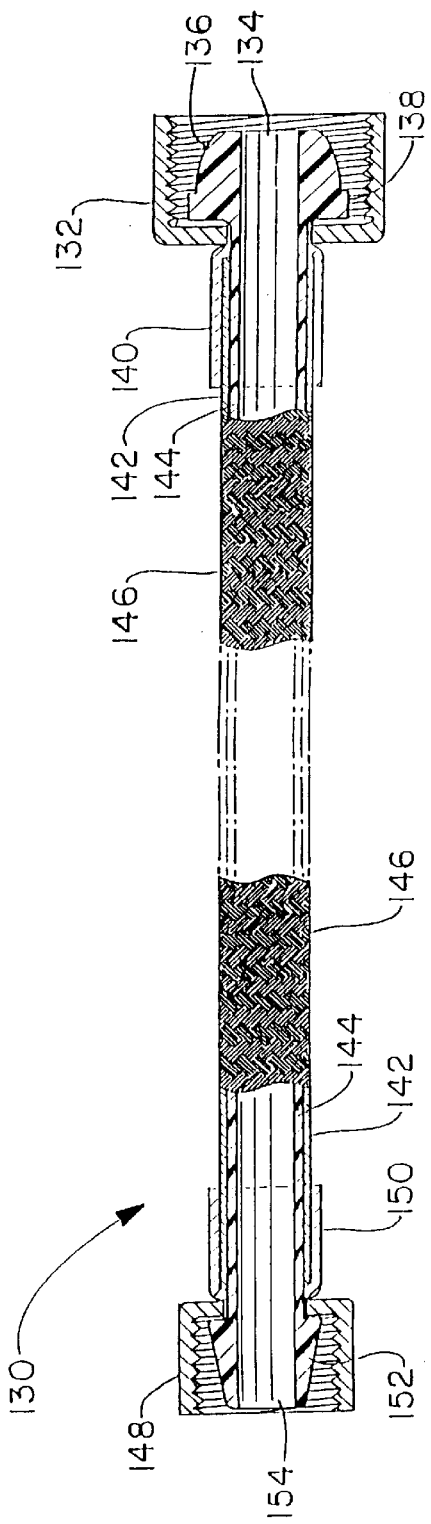
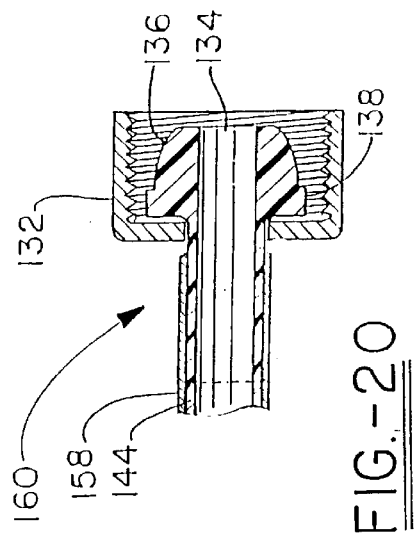
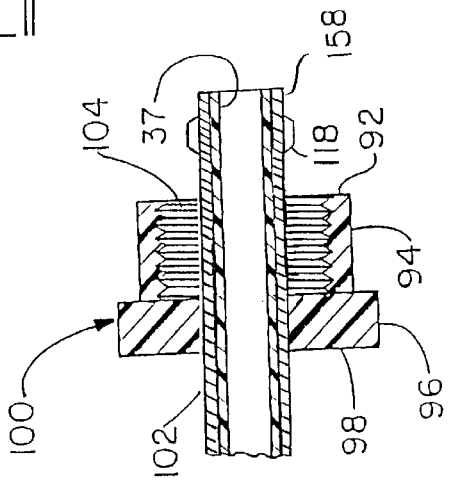
FIG.-19
FIG.-20
FIG.-27

THIN WALL COPPER SLEEVE FOR ALL PLASTIC CONDUIT

This application is a continuation-in-part of U.S. patent application Ser. No. 08/588,713, filed Jan. 19, 1996, now U.S. Pat. No. 5,622,670, which is a continuation-in-part of U.S. patent application Ser. No. 08/327,028, filed Oct. 21, 1994, now U.S. Pat. No. 5,527,503, which is a continuation-in-part of U.S. patent application Ser. No. 08/062,848, filed May 14, 1993, now abandoned.

TECHNICAL FIELD

The invention described herein pertains generally to a method for providing an all plastic conduit that capitalizes on the shape retaining characteristics of metallic, preferably copper, tubing, more preferably thin walled copper tubing. In its most generic sense, the all plastic conduit is encased in the metallic conduit in a water tight manner and can be used in a traditional manner using compression fittings on one or both ends. In a more specialized application, the process involves processing at least one polymeric tubing end, preferably a polyethylene tubing end, e.g., belling at least one polymer tubing end without compromising wall thickness, or fabricating at least one sealing nose cone configuration out of the tubing walls, thereby enabling the work piece to be suitable for plumbing applications, followed by encasing the tube into a metallic conduit for shape retention purposes or to achieve a "structured" look. The tubing may be crosslinked, the step of crosslinking occurring either before fabricating processing or subsequent to, depending upon the integral strength required at the tubing ends and the process used to crosslink the polymer. Prior to the processing of both tubing ends, a thin wall metallic sleeve conduit is inserted onto the tube thereby making a product which has all of the advantages of plastic tubing coupled with the shape retaining characteristics of metal tubing. The metal tubing, generally copper tubing is often plated, e.g., chrome, nickel, etc., for a decorative appearance.

BACKGROUND OF THE INVENTION

In plumbing installations, copper tubing is widely employed. In risers, used for connecting tubing to fixtures or tanks, the end of the copper tubing is shaped to form a bulb sealing surface and such bulb includes a shoulder permitting the tubing and the bulb sealing surface to be drawn into biting or sealing engagement with the fixture. The cost of such copper tubing and the cost of forming the same to permit the connection to such fixtures or tanks is substantial.

More recently, polymers such as polybutylene have been approved for use in plumbing. Tubing or pipe made of polybutylene is normally joined by heat-fusion techniques, by mechanical compression, and by cold flaring. In order to provide such polybutylene tubing with a bulb sealing surface or an end cap for such purposes, a variety of techniques have been employed. Two commonly employed techniques are: (1) spin-welding a separately molded bulb onto the outer diameter (O.D.) of the end of a tube; or (2) insert molding a bulb onto the O.D. of the end of a tube. All such processes have cost and performance drawbacks. Most require separately molded parts which must be joined to the tubing in assembly operations. Moreover, a two-part tubing end cap or bulb sealing construction does not have the performance integrity or the expected useful life of the tubing itself In the spin welding technique, excessive clamping pressures may cause the loaded part to become dislodged or separated from the O.D. of the tubing and the interface of the parts provides a possibility of leakage. In the case of a neoprene or like washer employed on the O.D. of the tubing, depending on the configuration of the tube/washer interface, the same leakage susceptibility is potentially present. Moreover, a flange formed to receive the washer may itself create a point of weakness if excessive clamping pressures are employed. Further neoprene washers are known to deteriorate with age and temperature exposure. Lastly, insert molding forces hot material over a cold tube surface, which can separate from the tube.

The solution to this problem of providing polybutylene tubing with an attached bulb sealing surface of unitary construction is detailed in U.S. Pat. Nos. 4,316,870, 4,446, 084 and 4,525,136, which are hereinby incorporated fully by reference. The thrust of these references however, is to teach the ability to maintain a constant diameter opening within the tubing, while the wall thickness is variable. This is of necessity, due to the configuration of the mold cavity, and insertion of the mandril inside the tubing during some of the processing steps.

A corresponding associated problem with the formation of the above-described male end of the polybutylene tubing, is the ability to bell an opposed end of the tubing, without any accompanying wall thickness compromise, which would make the product unsuitable for all plumbing applications, for which polybutylene has been approved, provided that a wall thickness can be maintained at 0.062"+0.010", as defined by ASTM 3309. In particular, it is desirable to use ⅜" O.D. polybutylene tubing with wall thickness of ¹⁄₁₆" (0.062") and subsequently insert a ½" CTS (copper tube size) fitting of nominal 0.501" O.D. The only way this can be achieved is through belling one end of the tubing from ⅜" O.D. (¼" I.D.) to ⅝" O.D. (½" I.D.). While it is possible to use ⅝" O.D. tubing to start, this uses more raw materials than necessary.

Prior art solutions to the formation of a bell on one end of polybutylene tubing is by heating a portion of the end of the tubing, followed by insertion of a mandril into the heated open end, the O.D. of the mandril being matched to the targeted inner diameter (I.D.) of the tubing. While this approach will bell the tubing, it is incapable of reproducibly making tubing product with a constant wall thickness of 0.062"+0.010" throughout the belled end, particularly in the neck region of the bell. This is due to the fact that the bell is made by expanding the I.D. and thus thinning the walls. A solution to this problem is found in U.S. Pat. No. 5,527, 503, the teachings of which are hereinby fully incorporated by reference.

The trend today however, is to shift from thermoplastic materials, e.g., polypropylene, polybutylene, etc., to combined thermoplastic/thermoset materials, e.g., crosslinked polyethylene wherein at least a portion of the polymer is crosslinked, for example approximately 65% thermoset/ 35% thermoplastic. However, this shift in materials is not simple in that there are several processing changes which must be incorporated in order to fabricate acceptable parts. Since thermosets in general, cannot be extruded like thermoplastics, differing processing conditions must be employed in different sequences in order to achieve similar functionality for the thermoset/thermoplastic product. Previously crosslinked material will not chemically bond to itself even when heated to the clear state. This means that the material forms from crosslinked material is not completely sealed upon itself, but rather molded in place with pressure. One prior art solution to this problem is the use of metal inserts which are positioned into rubber or plastic tubes and subsequently crimped in order to achieve a fitting. This is an inherent weak spot in the final product, and the industry has long sought to find a solution to the problem of developing a one-piece plumbing part made out of a thermoset plastic.

One of the drawbacks to using plastic tubing, whether of one-piece construction or not, lies in the fact that plastic tubing does not retain shape characteristics, e.g., bends of defined radius, which the plumbing installer may wish to make in the tubing. Another drawback is the lack of ability to plate or effectively color the plastic with a shiny appearance. While it is possible to tint the plastic, this coloration does not simulate the shiny appearance of chrome or nickel plating, which is necessary in plumbing connections made to pedestal sinks, for example.

SUMMARY OF THE INVENTION

In accordance with the present invention, there is provided a method for processing polymers which will enable a work piece to have one-piece formed/shaped ends from a single piece of tubing, the tubing being encased by thin-walled copper tubing thereby enabling the resulting conduit to be bent into various geometric shapes without tubing benders.

It is an object of this invention to provide an all plastic waterway that eliminates any potential of any extractable minerals, such as may occur when using copper tubing, yet still enables the plastic tubing to retain a geometric shape by the encasing of the tubing with thin walled copper.

It is another object of this invention to provide a process for forming a sealing surface shaped end on a combined thermoset/thermoplastic tube wherein the shaping results in a thermally bonded end of constant internal diameter, the part having been formed from a polyethylene tube which in one embodiment of the invention is crosslinked either prior to or subsequent to the formation of the fabricated end, the part being encased by thin-walled copper tubing thereby enabling the resulting conduit to be bent into various geometric shapes without tubing benders.

It is yet another object of this invention to capitalize on the flexibility of plastic tubing with the shape retention characteristics of copper tubing by the insertion of thin wall copper tubing over the plastic tubing subsequent to the fabrication of one, but not both ends of the plastic tubing.

It is still yet another object of this invention to provide a plastic tube which is in intimate physical leak-proof contact with the inside walls of a metallic tube thereby allowing the use of compression fittings.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 1 is a fragmentary vertical section of the dies employed to form the tubing in accordance with the present invention, such dies being shown separated from each other;

FIG. 2 is a view similar to FIG. 1 showing the tubing inserted through the female die, partially inserted on the male die and projection a predetermined distance from the former;

FIG. 3 is a view similar to FIGS. 1 and 2 showing the tube projection portion being heated;

FIG. 4 is a view similar to FIGS. 1–3 showing the dies being brought together;

FIG. 5 is a view similar to FIG. 4 showing the dies closed;

FIG. 6 is a fragmentary elevation of the end of the tube as formed by the process depicted in FIGS. 1–5;

FIG. 9 is a perspective view showing the tubing of FIG. 7 illustrating a non-linear configuration of the tubing;

FIG. 10 is an enlarged cross-sectional view similar to FIG. 8 illustrating an increased thickness of the tubing in the belled region;

FIG. 11 is a fragmentary vertical section of the dies employed to form the tubing in accordance with the present invention, the dies being shown separated from each other;

FIG. 12 is a view similar to FIG. 11 showing the tubing inserted through the female die, and projecting a predetermined length therefrom;

FIG. 13 is a view similar to FIGS. 11 and 12 showing the tube projection portion being heated;

FIG. 19 is a side view shown in partial cross-section showing a tubing connector having both a radiused and a conical sealing means with a stainless steel overbraid;

FIG. 20 is an enlarged cross-section view of a thin-walled copper sleeve which has been inserted onto a tubing connector;

FIG. 27 is an enlarged cross-section view of one end of a thin-walled copper sleeve which has been inserted onto a tubing connector wherein the tubing is using a compression fitting.

DETAILED DESCRIPTION OF THE INVENTION

Figure 7:
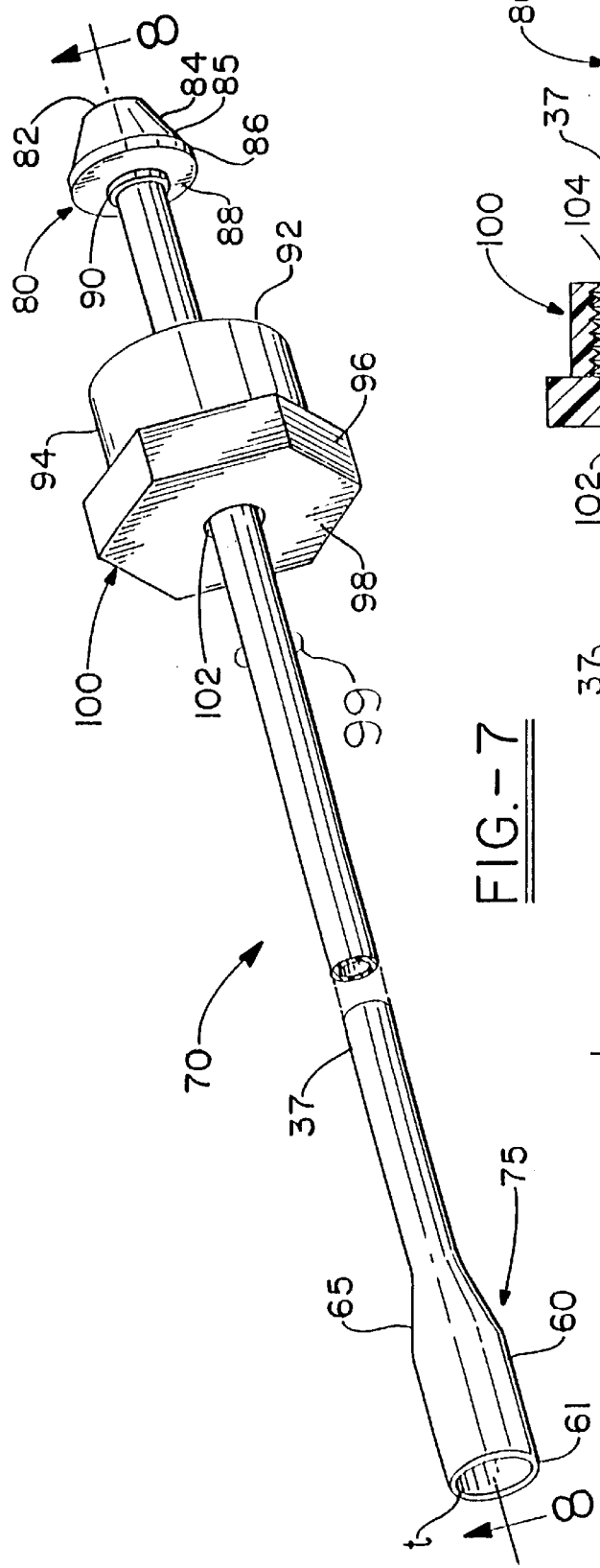
FIG. 7 is a perspective view showing the male and female segment of a section of tubing made in accordance with the teachings of this invention, wherein the male segment is an integrally molded bulb and sealing surface and the female segment is shown belled to a larger diameter, the thickness of the tubing being constant throughout, with internally threaded nut shown slightly below the male segment.

Referring now to the drawings wherein the showings are for purposes of illustrating the preferred embodiment of the invention only and not for purposes of limiting the same, the Figures show cut lengths of plastic tubing upon which various end configurations have been incorporated onto. This invention will describe various processes by which a tubing end is molded onto one end of a piece of plastic tubing, followed by insertion of a thin wall copper sleeve onto the plastic tubing thereby capitalizing on the benefits of plastic tubing with the shape retention properties of copper tubing. Optionally, the second tubing end can be processed if desired.

As seen in the figures, the tubing comprises a top vertically fixed mold (10) and a vertically movable bottom mold (11). The top mold or die (10) includes a central bore (12) and a riser tube (13) secured to the top thereof having an I.D. the same as the I.D. of the bore (12). The lower surface of the top mold is provided with a cylindrical projection (14) projecting centrally therefrom. The lower end of the bore is provided with a conical flaring portion (15), the lower end of which is provided with a small radius seen at (16). Radially beyond such radius, the bore is terminated in axially extending edges (17) and (18).

The bottom mold (11) includes a body (20) which may include an annular passage (21) for the circulation of cooling medium therethrough. The body (20) is threadedly connected to rod (22) of a piston-cylinder assembly and adjustably locked thereto by the nut (23). The top of the mold or die (11) is provided with a central recess shown generally at (25) which includes an upper cylindrical portion (26) into which the axial projection (14) of the top mold is designed closely to telescope. The lower end of the cylindrical portion is provided with a shoulder (27) separating the cylindrical portion of the recess from bulb forming cavity (28a) as shown in FIGS. 21–25, or belling cavity (28) as shown in FIGS. 1–5 or FIGS. 11–16. The lower circular bell forming cavity is provided with a horizontal circular axially facing end face (29) which is selectively larger in diameter than the diameter of the bore (12). Projecting axially from the bottom of the recess (25) is a guide rod (30), the top of which is provided with a pilot nose or pointed portion (31).

Fabrication of a belled tubing end

This discussion will focus on the technology used to fabricate at least one belled end in the tubing connector, wherein the thickness of the belled tubing walls has not been compromised. In FIG. 1, the top and bottom molds or dies have been brought to an intermediate position relative to each other in that the bottom mold (11) has been brought to an intermediate elevated position and the position may be determined by a retractable adjustable stop as seen at (33). In such position, the pilot nose of the guide rod (30) projects into the bore (12) as shown.

Referring to FIG. 2, it will be seen that the top of the guide tube (13) is provided with a back stop seen at (35) which may be pivoted to the top of the guide tube (13) for swinging movement to and from a position clear of the I.D. of such tube or over the I.D. of such tube.

An extruded polyolefin plastic tube section, which may or may not be crosslinked at this point in the fabrication, cut to a predetermined length, is now inserted downwardly through the guide tube as seen at (37) to project from the lower end of the top mold (10). The dimensions of the tube O.D. and I.D. are such that the tube will fit snugly in the I.D. of the bore (12) with the I.D. of the tube fitting snugly over the O.D. of the rod (30). It is important that the tube (37) project a predetermined distance below the top mold (10). This predetermined distance can be obtained in several ways. When the operator inserts the tube, the operator can insure that the top of the tube is flush with the top of the guide tube (13) and pivoting the back stop (35) over the top of the tube gages the tube against such back stop. In this manner, the tube length may be gaged from the top end to project the predetermined distance noted. Alternatively, a gage bar, shown at (40) may be employed to contact the lower end of the tube to obtain the desired projection.

With the molds still in their intermediate position and the tube properly positioned and projecting from the top mold, the projecting end of the tube is now heated as seen in FIG. 3. The heating of the tube may be accomplished in a variety of ways. In FIG. 3, two heating blocks (42) and (43) are employed, each provided with electrical heating elements seen at (44) and (45), respectively, to confine the projecting end of the tube (37) therebetween by closure as indicated by the arrows (48,49) of the heating blocks. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold to a larger diameter (46,47) when the dies are brought together. While those skilled in the art are familiar with the temperatures described in this operation (e.g., 600°–900° F.), for illustrative purposes only, this temperature would be approximately 700° F.±25° F. for a time of between 10–30 seconds in the case of polypropylene, and approximately 700°±25° F. for a time between 15–35 seconds for crosslinked polyethylene. The key is to balance temperature and dwell time within the heating blocks. It is well within the skill of those in the art to vary the time and/or temperatures noted to achieve the desired degree of "softness" necessary for further processing.

After the desired amount of heat is applied, the heating blocks are removed. Depending upon the polymer and/or time and/or temperatures used, a cooling cycle may be employed before the initiation of the next step. If a bottom gage is employed, the gage (40) is also removed and the retractable step (33) is withdrawn. With the back stop (35) in place, the piston-cylinder assembly of the rod (22) is now further extended as seen in FIG. 4, and the projecting end of the tube seats in the bottom face (29) of the belling cavity (28) and begins to form as seen at (52). As the bottom mold (11) moves upwardly as indicated by the arrows (54) and (55) in FIGS. 4 and 5, the axial projection (14) of the top mold telescopes within the cylindrical recess (26) of the bottom mold. The bottom mold continues upwardly to the position shown in FIG. 5, forming the tube end as indicated. During such movement, the back stop (35) keeps the tube from moving upwardly with respect to the top mold. The piston-cylinder assembly is fully extended until the edge (18) of the top mold engages the shoulder (27). Such edge will tend to bite off or render easily removable any flash formed between the telescoping surfaces of the molds. Alternatively, a stop or gage ring can be provided as seen at (57) to limit the relative movement of the molds to avoid wear on the edge (18). When the molds are fully together as seen in FIG. 5, a cooling medium may be circulated through the passage (21). While water is preferred, it will be appreciated that the cooling medium could be many other fluids such as oil or a gas.

After the mold has been cooled for a predetermined time, the piston-cylinder assembly of the rod (22) is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold (10) would be opened and the part removed from the top mold in a vertical direction.

After the tube is removed, the top mold remains in alignment with the bottom mold and the stop (33) is returned to its position and the piston-cylinder assembly is extended to bring the molds back to the original FIG. 1 position so that the process may be repeated.

It will be appreciated that the tooling illustrated may be either horizontally or vertically oriented and that the recess configurations may be readily altered to form a belled end of varying configurations. Also, the tube holder (13) can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold (10) may be termed the female mold while the moving mold (11) with the guide rod projecting therefrom and holding the I.D. of the tube may be termed the male mold or die.

The resultant product of the process described in FIGS. 1–5 is seen in FIG. 6. The plastic tube thus formed includes an integrally formed belled end into which a suitably dimensioned copper fitting for example, could be inserted. The plastic tube thus formed, includes an integrally formed belled surface (60) extending from the end face (61) of the tube to conical neck (65). The end face (61) of the tube has both a larger I.D. and O.D. than the remainder of the tube, but the thickness of all portions of the tube are the same.

As shown in FIG. 11, alternative mold designs are envisioned equally applicable to the process described previously. In discussing this alternative embodiment, like part numbers are referred to using the same reference numerals described previously. Similar, but modified parts are designated by the inclusion of a prime (') after the reference numeral. The device includes a top vertically moveable two-piece horizontally operating clamping die (9), a center vertically-fixed two-piece horizontally operating mold (10') and a vertically moveable bottom mold (11'). The clamping die (9) includes a central bore, the diameter of which is equal to a diameter sufficiently smaller than the diameter of the tube to be belled so as to cause a clamping effect on the tube when the clamp die (9) is closed.

The center vertically-fixed two-piece horizontally operating mold (10') includes a central bore, of the same diameter as the tube to be belled. The lower end of the bore is provided with a conical flaring portion (15'), the lower end of which is of a diameter and length equal to the outside diameter and length of the belled end of the tube.

The bottom mold (11') includes a body (20') which may include an annular passage (21') for the circulation of a cooling medium therethrough. The body is threadedly connected to rod (22) of a piston-cylinder assembly and adjustably locked thereto by nut (23). The bottom mold or die (11') is provided with a central recess shown generally at (25') into which the axial projection (14') of the top mold (10') is designed closely to telescope. Projecting from the bottom of the recess (25') is rod (30'), the diameter of the rod at the bottom of the recess of equal diameter to the I.D. of the belled end of the tube and maintained for a distance equal to the depth of the tube bell. Rod (30') terminates at top (31') and is radiused to corresponding conical flaring portion (15') at conical segment (32).

In sequenced operation and shown in successive figures, this modified mold and die design is identical in concept, and implementation to that previously detailed and all related discussion is equally applicable to either embodiment. As shown in FIG. 12, plastic (37) is inserted through clamping mold (9) and top mold (10'), resting on tube position stop (40). The two halves of the clamping mold (9) are closed thereby holding plastic (37) firm.

In FIG. 13, clamping mold (9) is moved to a position extending the lower end of the plastic (37) into a cavity in heating blocks (42). The split halves of center mold (10') are closed about the circumference of plastic body (37) during the heating cycle to provide stability to the tube during the heating cycle.

Figure 15:
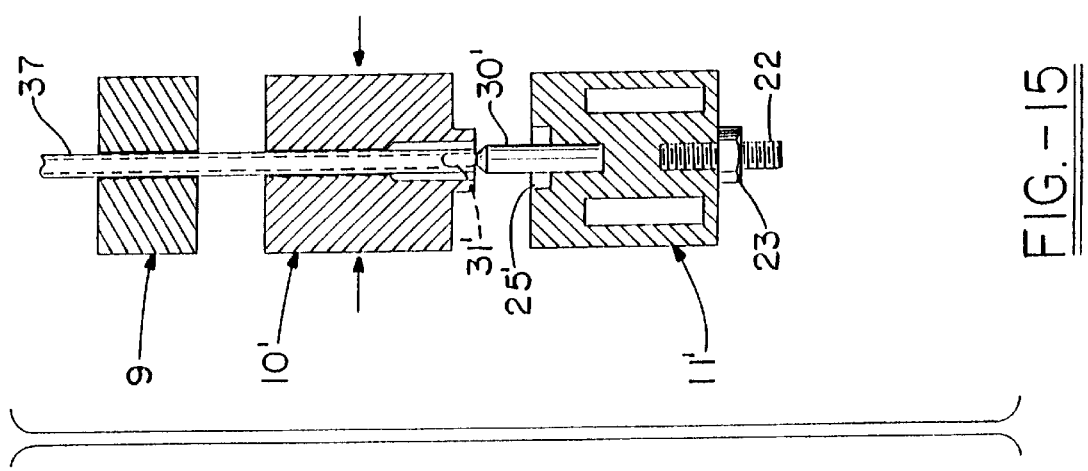
FIG. 15 is a view similar to FIGS. 11–14 showing the dies being brought together.
Figure 14:
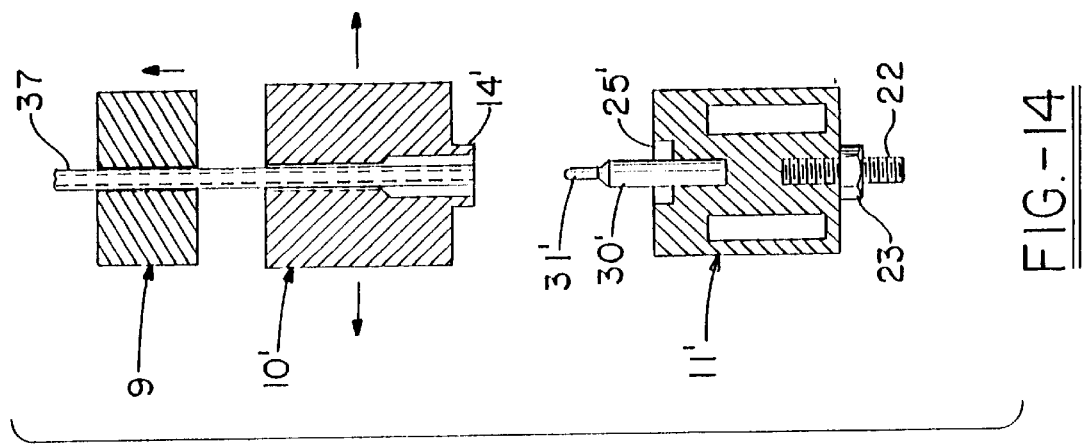
FIG. 14 is a view similar to FIGS. 11–13 showing the clamping die retracting the projecting tubing portion back into the middle die for subsequent belling.

With the heating cycle completed, center mold (10') is opened and clamping mold (9) returned to its original disengaged position. The heated end of plastic (37) is now positioned in the belled cavity of center mold (10') as shown in FIG. 14. In FIG. 15, the center mold (10') has been closed about plastic (37) and bottom mold (11') moved upward with the pilot nose (31') of guide rod (30') penetrating the heated end of the tube.

Figure 16:
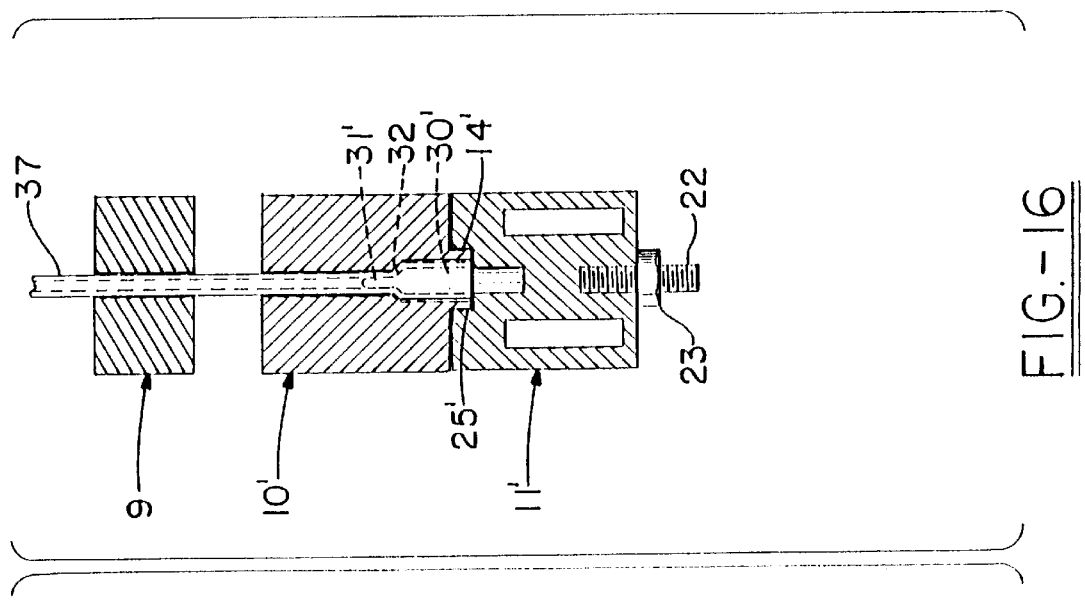
FIG. 16 is a view similar to FIGS. 11–15 showing the dies closed.

In FIG. 16, bottom mold (11') is completely extended, forcing the heated plastic into the cavity created at the connection center mold (10') and bottom mold (11'). After a sufficient period of cooling, all molds are returned to their original positions and the belled tube is then removed from the molds.

While a plumbing connector wall thickness (t) throughout, is shown in FIG. 9, the application is not necessarily limited to such. As shown in FIG. 10, it is possible to fabricate plumbing connector (70) wherein the wall thickness (t'), is greater than that of the mid-portion of tube (37). In other words, (t')>(t). Such a configuration is made by increasing the thickness of the die cavity containing circular bell forming cavity (28). As discussed previously in relation to a constant wall thickness (t), thickness (t') will require that tube (37) project an even longer distance below top mold (10) than used when thickness (t) is desired. This is necessary such that subsequent to the softening of the projecting end of tube (37) via the action of heating blocks (42) and (43), or other heating means, and the dies have been brought together, the larger die void, i.e., bell forming cavity (28) will be filled with polyolefin.

Fabrication of a sealing surface

Figures 21, 22, 23:
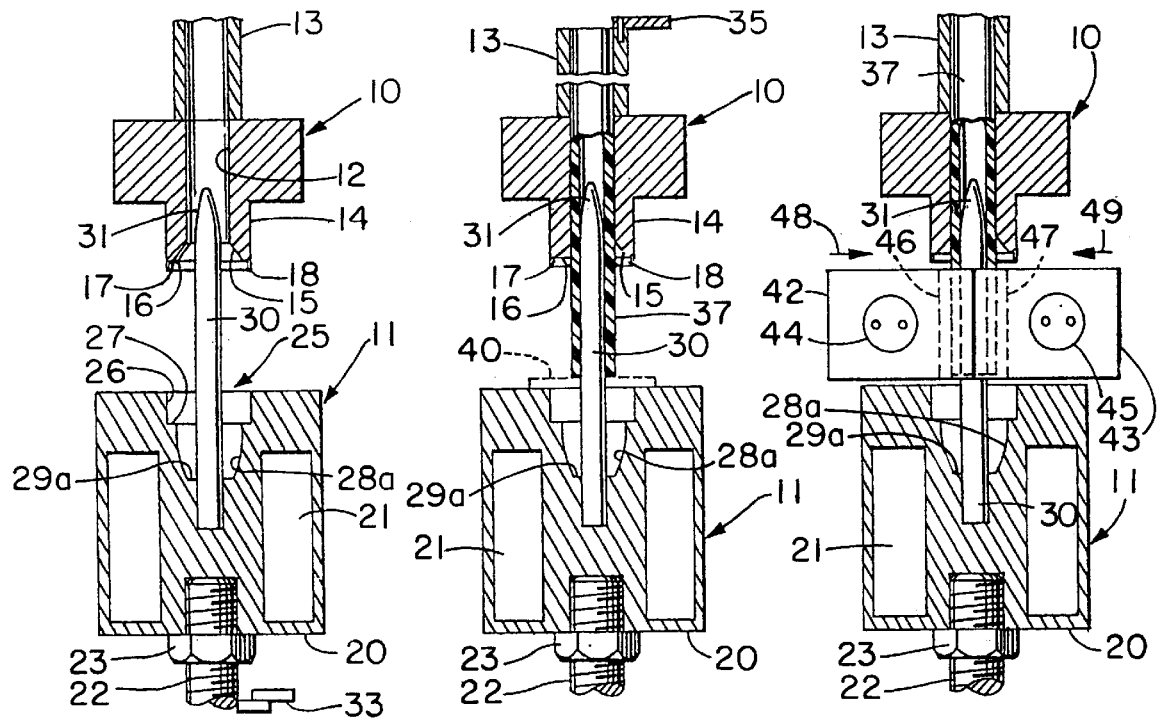
FIG. 21 is a fragmentary vertical section of the dies employed to form the sealing end of the tubing in accordance with the present invention, such dies being shown separated from each other.
FIG. 22 is a view similar to FIG. 21 showing the tubing inserted through the female die, partially inserted on the male die and projection a predetermined distance from the former.
FIG. 23 is a view similar to FIGS. 21 and 22 showing the tube projection portion being heated.

This discussion will focus on the technology used to fabricate at least one sealing surface end in a tubing connector wherein the sealing surface is integral with the tubing. In FIG. 21, the top and bottom molds or dies have been brought to an intermediate position relative to each other in that the bottom mold (11) has been brought to an intermediate elevated position and the position may be determined by a retractable adjustable stop as seen at (33). In such position, the pilot nose of the guide rod (30) projects into the bore (12) as shown.

Referring to FIG. 22, it will be seen that the top of the guide tube (13) is provided with a back stop seen at (35) which may be pivoted to the top of the guide tube (13) for swinging movement to and from a position clear of the I.D. of such tube or over the I.D. of such tube.

An extruded polyolefin plastic tube section, which may or may not be crosslinked at this point in the fabrication, cut to a predetermined length, is now inserted downwardly through the guide tube as seen at (37) to project from the lower end of the top mold (10). The dimensions of the tube O.D. and I.D. are such that the tube will fit snugly in the I.D. of the bore (12) with the I.D. of the tube fitting snugly over the O.D. of the rod (30). It is important that the tube (37) project a predetermined distance below the top mold (10). This predetermined distance can be obtained in several ways. When the operator inserts the tube, the operator can insure that the top of the tube is flush with the top of the guide tube (13) and pivoting the back stop (35) over the top of the tube gages the tube against such back stop. In this manner, the tube length may be gaged from the top end to project the predetermined distance noted. Alternatively, a gage bar, shown at (40) may be employed to contact the lower end of the tube to obtain the desired projection.

With the molds still in their intermediate position and the tube properly positioned and projecting from the top mold, the projecting end of the tube is now heated as seen in FIG. 23. The heating of the tube may be accomplished in a variety of ways. In FIG. 23, two heating blocks (42) and (43) are employed, each provided with electrical heating elements seen at (44) and (45), respectively, to confine the projecting end of the tube (37) therebetween. It will of course be appreciated that other forms of application of heat may be employed such as sonics or a heating jacket employing oil or other heating medium.

The projecting end of the tube is heated for a predetermined length of time so that the projecting end of the tube is heated short of a complete melt, but sufficiently to make the material pliable enough to mold when the dies are brought together. While those skilled in the art are familiar with the temperatures described in this operation (e.g., 600°–900° F.), for illustrative purposes only, this temperature would be approximately 700° F.±25° F. for a time of between 10–30 seconds in the case of polypropylene, and approximately 700°±25° F. for a time between 15–35 seconds for crosslinked polyethylene. The key is to balance temperature and dwell time within the heating blocks. It is well within the skill of those in the art to vary the time and/or temperatures noted to achieve the desired degree of "softness" necessary for further processing.

Figures 24, 25:
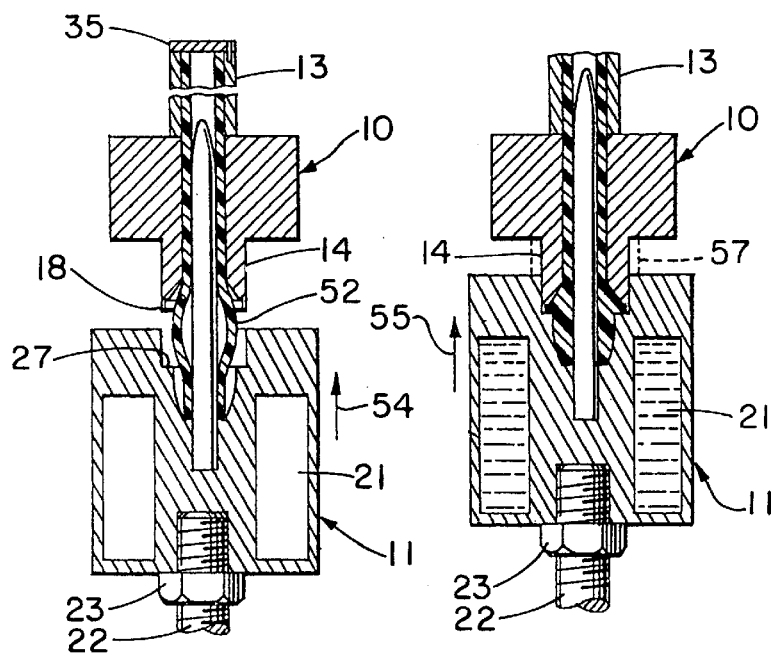
FIG. 24 is a view similar to FIGS. 21–23 showing the dies being brought together.
FIG. 25 is a view similar to FIG. 24 showing the dies closed.

After the desired amount of heat is applied, the heating blocks are removed. Depending upon the polymer and/or time and/or temperatures used, a cooling cycle may be employed before the initiation of the next step. If a bottom gage is employed, the gage (40) is also removed and the retractable step (33) is withdrawn. With the back stop (35) in place, the piston-cylinder assembly of the rod (22) is now further extended as seen in FIG. 24, and the projecting end of the tube seats in the bottom face (29a) of the bulb forming cavity (28a) and begins to form as seen at (52). As the bottom mold (11) moves upwardly as indicated by the arrows (54) and (55) in FIGS. 24 and 25, respectively, the axial projection (14) of the top mold telescopes within the cylindrical recess (26) of the bottom mold. The bottom mold continues upwardly to the position shown in FIG. 25 forming the tube end as indicated. During such movement, the back stop (35) keeps the tube from moving upwardly with respect to the top mold. The piston-cylinder assembly is fully extended until the edge (18) of the top mold engages the shoulder (27). Such edge will tend to bite off or render easily removable any flash formed between the telescoping surfaces of the molds. Alternatively, a stop or gage ring can be provided as seen at (57) to limit the relative movement of the molds to avoid wear on the edge (18). When the molds are fully together as seen in FIG. 25, a cooling medium may be circulated through the passage (21). While water is preferred, it will be appreciated that the cooling medium could be many other fluids such as oil or a gas.

After the mold has been cooled for a predetermined time, the piston-cylinder assembly of the rod (22) is fully retracted and the top mold may be indexed horizontally so that the now formed tube may be removed. If any flash appears, it can readily be removed from the tube. While the discussion has focused on the top mold being of unitary construction, it is equally envisioned that a split mold could be employed. In this embodiment, and the piston-cylinder assembly is fully retracted, the split halves of top mold (10) would be opened and the part removed from the top mold in a vertical direction.

After the tube is removed, the top mold remains in alignment with the bottom mold and the stop (33) is returned to its position and the piston-cylinder assembly is extended to bring the molds back to the original FIG. 21 position so that the process may be repeated.

It will be appreciated that the tooling illustrated may be either horizontally or vertically oriented and that the recess configurations may be readily altered to form a sealing surface e.g., radiused, of varying configurations. Also, the tube holder (13) can be readily changed to accommodate tubes precut to different lengths. In practicing the process, it is important however, that the projecting heated end of the tube substantially conform to the volume of the mating recesses in the two dies or molds. Whether employed horizontally or vertically, the relatively fixed mold (10) may be termed the female mold while the moving mold (11) with the guide rod projecting therefrom and holding the I.D. of the tube may be termed the male mold or die.

Figure 17:
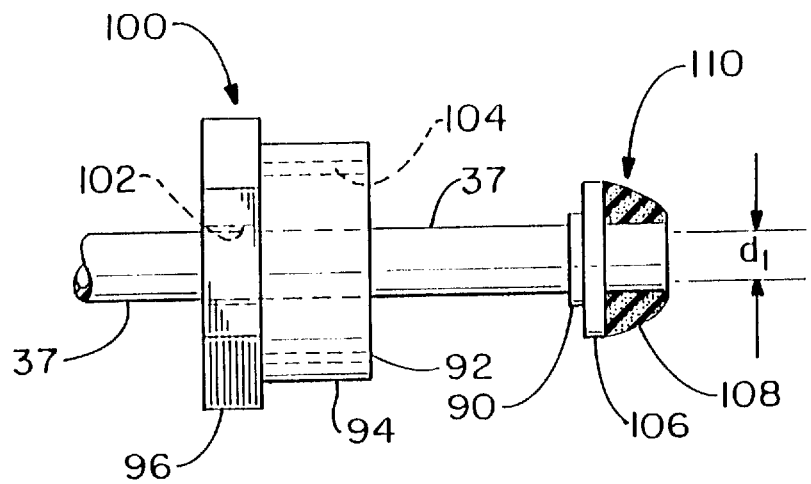
FIG. 17 is a perspective view showing the male and female segment of a section of tubing made in accordance with the teachings of this invention, wherein the male segment is an integrally molded ledge with a soft nose cone sealing surface and the female segment is shown belled to a larger diameter, the thickness of the tubing being constant throughout, with internally threaded nut shown slightly below the male segment.

While unitary molded end cap (80) has been previously prepared in accordance with the mold design shown in U.S. Pat. No. 4,316,870, U.S. Pat. No. 4,446,084 and U.S. Pat. No. 4,525,136, it is not limited in shape to such. It should be recognized that while a molded end cap such as that shown in FIGS. 7–10 may be highly desirable when using polybutylene, crosslinked polyethylene can be significantly harder and more rigid, or softer and more flexible, and does possess different sealing characteristics. In some instances, i.e., an alternative embodiment, it is preferable to switch to a different mold design for the molded end cap, such as to produce a tubing end (110) as shown in FIG. 17, wherein a constant diametered ($d_1$) tube is shown having a tubing wall thickness (t) and a nose cone shelf (106) projecting essentially normal to the longitudinal axis of the tubing as shown. The sealing bulb (108), shown in cross-section, is a separate insert which seats itself onto one side of the nose cone shelf (106) and is typically made of a rubber polymer (e.g., EPDM, neoprene, TPR, TPE, etc.) which is softer than crosslinked polyethylene.

Figure 18:
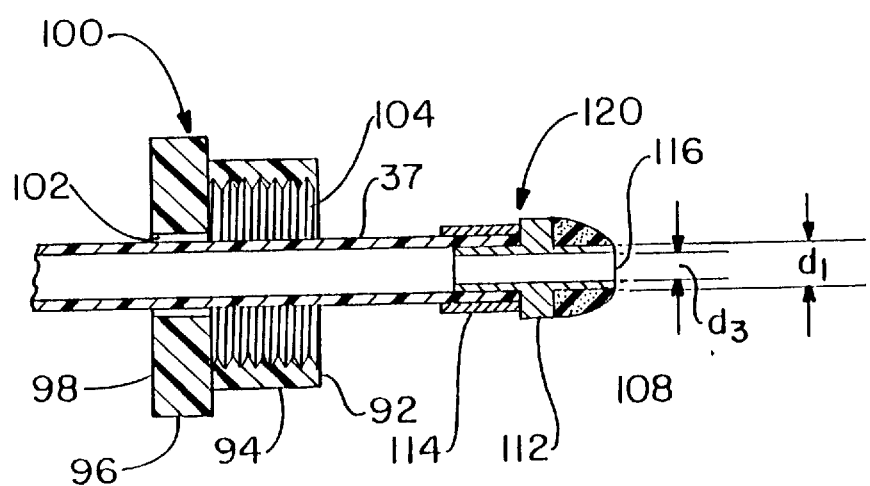
FIG. 18 is an enlarged cross-sectional view of a prior art tubing connector.

The tubing end shown in FIG. 17 is distinct when contrasted to the design which the Prior Art has been using when crosslinked polyethylene is the tubing material as shown in FIG. 18 (120). The nose cone shelf (112) is actually a component of a metal insert (116) which is held into place via metallic or plastic ring (114) which is compression fit (crimped) or shrunk onto the exterior of the tube. The metal insert (116) is of diameter ($d_3$) which is of slightly smaller I.D. than the original tube I.D. ($d_2$). This Prior Art product inherently is weaker than a molded end cap as any crimped fitting potentially can separate leading to field failure.

Insertion of thin wall copper sleeve

It is recognized that after the processing of one, but not both ends of the tubing, whether that end is processed into a belled end or into a sealing surface end, the thin wall copper tubing is inserted over the outside diameter of the plastic tubing. While it is recognized that copper tubing having a normal wall thickness could be employed in this invention, there is no need to do so. The copper sleeve is not being used as a conduit for the liquid or gas, but rather is being employed for its shape retention capabilities as well as superior visual appearance when plated. The strength characteristics of the tubing are derived from the plastic.

Plastic tubing is highly desirable from an installation standpoint in that it can be easily shaped to bend around various objects without kinking. For purposes of this discussion, kinking is a phenomenon associated with copper tubing which is typically greater than ¼" in diameter where bending the tubing without the use of tubing benders will result in a non-uniform internal diameter of the copper tube, generally known in the art as "kinking", potentially restricting flow through the tube. While this is typically associated with rather severe tubing bends in larger diametered copper tubing, it can manifest itself in smaller diametered copper tubing when the degree of bending approaches bending the tubing upon itself. Another benefit of plastic tubing is that due to its inherent flexibility, there is no need for precise dimensional measurement during the installation operation, which is of extreme benefit to the casual installer.

While the benefits of plastic tubing are readily apparent from an installation viewpoint, it does suffer from a visual appearance standpoint, particularly when used with pedestal sinks where the riser tubes are exposed to view. While plastic may be tinted or colored as indicated previously, it still cannot attain the shiny appearance of chrome or nickel plated copper tubing. Additionally, while the flexibility of plastic tubing is highly desirable for installation purposes, there are many times when the customer desires a less flexible appearance. The insertion of a thin wall copper sleeve, preferably plated with chrome or nickel, will result in a more geometric visual appearance.

Plumbing connector

FIG. 7 illustrates one embodiment of a completed plumbing connector (70), shown without copper sleeve, comprising a unitary molded end cap (80), nut (100), and belled end (75). The length of connector (70) is of any length, and configuration. It may be straight or contain a myriad of bends and twists. What is critical however, is that subsequent to the formation of the end cap (80), the nut (100) is positioned onto the connector with the open face (92) of nut (100) facing toward end cap (80). It is not possible to insert nut (100) subsequent to the belling step described previously or the sealing surface step also described previously.

Unitary molded end cap (80) comprises a belled sealing surface (84) extending from the end face (82) of the tube to radially extending flange (86). The sealing surface (84) may be radiused as indicated or it may be conical. The end face (82) of the tube has a slightly larger O.D. than the remainder of the tube so that the wall of the tube at the sealing surface is substantially enlarged throughout its length. The sealing surface terminates in the flange (86) which includes a stop face (85) adjacent the sealing surface and a shoulder (88) on the opposite side. From the shoulder to the O.D. of the tube, there is provided a fillet (90) which joins the flange spaced from the peripheral edge thereof with either a slight radius (65) as shown in FIG. 6 or a collar (90) as shown in FIG. 7.

Figure 8:
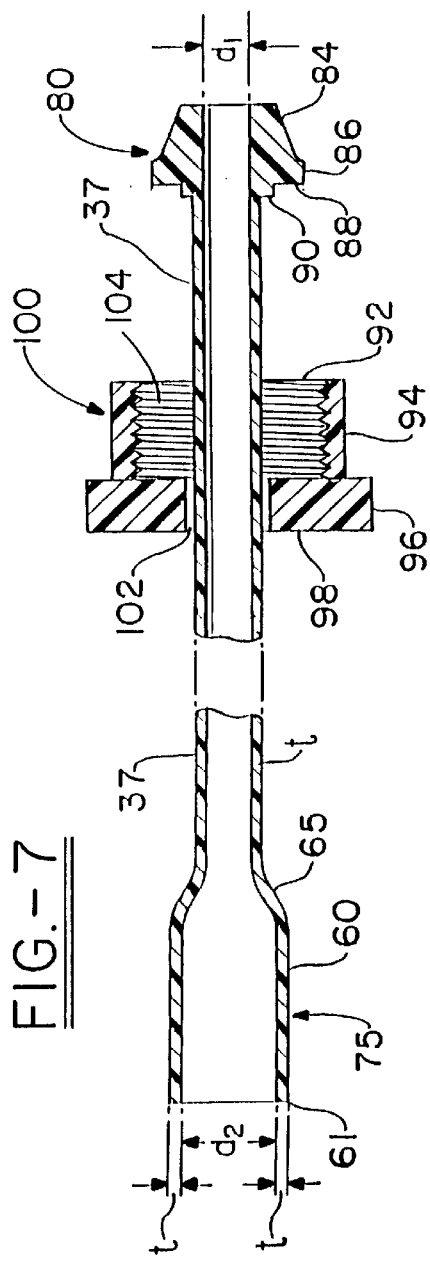
FIG. 8 is an enlarged cross-sectional view taken along line 8—8 of FIG. 7.

Nut (100), which is inserted prior to the belling step, and after the formation of unitary molded end cap (80), is positioned onto connector (70) of diameter ($d_1$) through nut opening (102) which is of larger diameter than ($d_1$), but of smaller diameter than shoulder (86), with open face (92) positioned toward end cap (80). Nut (100) contains a threaded circular bore (104) of predetermined height (94) which is used to sealingly engage a mating threaded receiver (not shown). As nut (100) is tightened by a plurality of parallel-spaced ridges (96), end cap (80) is brought into leak-proof engagement with the threaded receiver by the top surface (98) of nut (100), through its engagement onto shoulder (88) of end cap (80) as best shown in FIG. 8. In one embodiment of this invention, shown only in FIG. 7, retaining ridges (99) are compression molded into the shaft of the tube, serving the purpose of retaining the nut (100) close to the molded end cap (80). Due to the flexible nature of the thermoplastic starting material, nut (100) is capable of being inserted over the retaining ridges (99) by the application of a slight pressure. The precise positioning of the retaining ridges is not critical, but generally is in close proximity to the sealing end of the tube. The ridges are molded into the tubing design through a simple modification of the mold design used to fabricate the sealing end. The number of retaining ridges can be variable, being at least one, preferably at least two opposed nodules on the shaft of the tube. Higher number of retaining ridges are also envisioned within the scope of this invention, the number being dependent upon both cost and geometric space considerations.

Connector (70) is thus, of unitary construction, of original diameter ($d_1$) and thickness (t), which through the process of heating and molding into an appropriately configured die, is shaped into end cap (80), still of diameter ($d_1$). After insertion of nut (100), and subsequent heating of an opposed end to end cap (80) of connector (70), followed by molding into a second appropriately configured die, belled end (75) is fabricated of larger diameter ($d_2$), but still of thickness (t).

As shown in FIG. 9, the plumbing connector (70) need not be in a linear configuration along a longitudinal axis of the connector. In fact, non-linear configurations are well-within the scope of the invention. Such bends within the connector can be: (1) permanent, the result of post fabrication techniques, such as mild, fairly localized heating to a softening point of the material, followed by bending and molding within a fixture that will hold the desired angle and radius, followed by cooling, and other processes which are known-in-the-art; or (2) non-permanent.

However, using a technique such as that described in option #1 above, is not typically something that can be easily performed during the installation process, and with many newer configurations of sinks, e.g., pedestal, option #2 is not desirable. In order to overcome this problem, the thin wall copper tubing sleeve is inserted over the plastic tubing. This now permits the installer to manually bend the tubing, even without the aid of tubing benders, although the use of such is not precluded, and have the part retain the imparted shape. This facilitates the installation, yet provides neat clean lines for visual appearance.

While the tubing connectors have generally been shown having one molded end and one belled end, there is no need to limit the invention to such. In fact, depending upon the intended application, it may be highly desirable to have two molded ends (130) as shown in FIG. 19 or two belled ends. Connector (130) is an example of a connector with two molded ends (134, 154), one end being conical (136) and having a shelf (138) with the other end being radiused (152). The connector is of a multilayered construction having an internal crosslinked thermoplastic layer (142), with a stainless steel overbraid layer (146), attached to the conical end via metallic ring (140) and to the radiused end by metallic ring (150). Each end further contains an attachment means (132, 148), in this example, being a threadably engagable nut.

While an example of a stainless steel overbraid is shown in FIG. 19, other configurations are also possible, wherein the best embodiments of both copper tubing and plastic are combined. As seen in FIG. 20, one end of a one-piece polymeric tubing end is shown which is encased in a thin wall copper sleeve (158). When the thin walled copper sleeve (e.g., 0.008 to 0.020 thickness) is plated, the plastic tube can visually appear as another number of colors, e.g., stainless steel, gold or black tube, but yet which is an all plastic pathway for liquids (e.g., water, etc.) which may be carried within. This tube (160) can be bent using standard copper bending tools or by hand, yet will not collapse due to the plastic tube inside (144). Additionally, the copper sleeve encased plastic tube will retain the shape to which it is bent, due to the copper sleeve. This feature permits utilization in applications such as free standing pedestal sinks which typically do not use plastic risers since their appearance looks "random" as opposed to "structured" as seen in FIG. 26.

Figure 26:
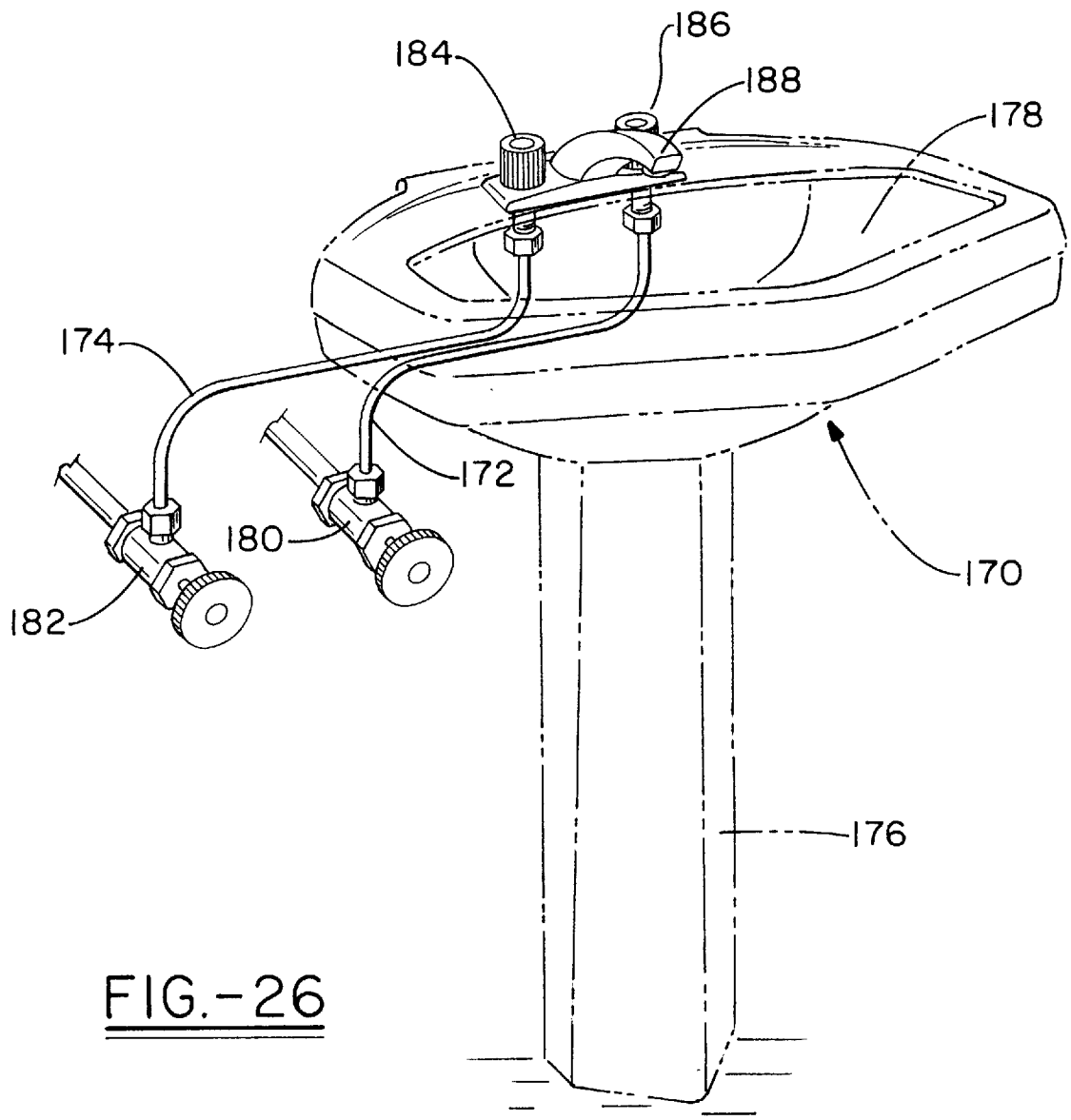
FIG. 26 is a perspective view of a pedestal sink showing the ability of the all plastic waterway encased with thin wall copper tubing, to retain its geometric shape after bending.

The sink (170) in FIG. 26 is shown as having a pedestal base (176) which supports a sink basin (178), to which is attached a faucet (188) which has a cold water tap (184) and a hot water tap (186). The faucet is connected to the cold and hot water lines through shut-off valves (180,182) and riser tubes (172,174). These risers are shown in detail for one end in FIG. 20, and exemplify the ability to bend the tubing into geometric shapes, thereby giving the waterway a "structured" look in an easy-to-install manner. By combining thin walled copper, which may in a preferred embodiment by plated, with crosslinked polyethylene tubing, the advantages of both materials can be realized, coupled with the fact that thinner walled copper can be used since the burst strength is incorporated into the plastic tube, and the plated copper is primarily for decorative and shape retention purposes.

In one specialized embodiment of this invention, when using crosslinked polyethylene made by a process such as the Engel process, although not limited to this process, it is possible to capitalize on the fact that the extruded plastic always returns to its extruded size when heated to about 280° F. to 300° F. This "memory" feature of the crosslinked polyethylene permits the facile insertion of a copper sleeve over the polyolefin tube, which when heated will expand to its original size, thereby making an extremely tight fit (in some instances, leak-proof) on the inner diameter of the copper sleeve. The expansion is possible due to the fact that as the crosslinked polyethylene tube is extruded, it is drawn down in size to a smaller diameter during a sizing process. Thus, when this drawn down tube is reheated, the crosslinked polyethylene tube will expand to its original extruded size, thereby filling the copper tube and making the mechanical fit almost impossible to remove by ordinary means. Specialized shaped plastic tubes which are sleeved within convoluted copper tubes are possible via this technique.

Additionally, it is possible to crosslink the polyolefin tube, heat it with subsequent drawing down in diameter followed by cooling. When this tube is re-heated, it will expand to the original size when the tube was crosslinked. Another alternative is the use of a blow molding process, wherein the tube is inserted into a copper sleeve and through the combination of heat and air pressure, the plastic tubing is expanded to the inner diameter of the copper sleeve.

While in a preferred embodiment, the temperature range for the drawn down process will be from about 280° F. to 300° F., it is believed that the process will operate at both temperatures which are above and below this range, e.g., 270° F. to 320° F., without departing from the scope of this invention. What is important is that the initial outer diameter of the plastic tube be essentially as large as, and preferably greater, than the internal diameter of the metallic tube. One specific example would be to use extruded plastic tubing of outer diameter of 0.330" or greater (e.g., 0.450") and a copper tube of internal diameter of 0.330". The plastic tube is drawn down to an outer diameter of 0.320" or smaller (e.g., 0.300"), thereby permitting the insertion of the copper tube over the plastic tube in a sleeve-like manner. By subsequently re-heating the plastic tube to from about 270° F. to 320° F., more preferably from about 280° F. to 300° F., the plastic tube will expand to the internal diameter of the copper sleeve, thereby providing in many instances, a leak-proof fit.

Guidelines which are useful in this aspect of the invention would include determining the size of the ferrule which is to be inserted over the copper tube. For ⅜" (0.375") outer diameter copper tubing, having a thickness of 0.020", the initial outer diameter of the plastic tubing should be about 0.335" or greater. The plastic tubing, through the application of heat will be reduced in outer diameter less than 0.335", so that the copper tube sleeve can be easily inserted over the reduced diameter plastic tube. The operator through a combination of controlling the drawn down diameter and/or coupling with re-heating of the plastic tube can control the "snugness" of the fit between the two conduits, i.e., the outer metallic conduit and the inner plastic conduit.

Thus what has been described in general is a process for the preparation of a plastic tube which is encased by a metallic sleeve which uses the steps of (a) heating an extruded polyolefin tube to a first temperature sufficient to enable the tube to be reduced in outer diameter, this initial outer diameter being essentially as large as the internal diameter of the metallic sleeve, and preferably larger than this internal diameter; (b) reducing an outer diameter of the tube from a first diameter to a second smaller diameter, this second smaller diameter permitting the metallic sleeve to be inserted over at least a portion of the tube; (c) inserting a metallic sleeve which has an internal diameter which is greater than the second diameter of the tube over at least a portion of the tube; and (d) reheating at least a portion of the tube to a second temperature sufficient to cause the tube to expand from the second diameter to essentially the inner diameter of the metallic sleeve. This last step will at least reduce, and in a preferred embodiment, eliminate any annular flow which may occur between the two conduits when there is no plastic formed ends on the plastic tube, and sealing engagement is effected by a ferrule on the outer metallic tube.

FIG. 27 shows a connector which has been made in accordance with the specialized process described above. The plastic tube (37) is encased in a thin walled copper sleeve (158) in a leak-tight manner. This arrangement now permits the use of traditional compression fittings (118) (e.g., brass o-rings or ferrules) to effect a sealing engagement with a fixture, yet still maintain an essentially all-plastic waterway, that has the visual appearance of plated copper tubing. In a generic sense, the product is a metallic encased plastic tube which is (a) a plastic tube inner conduit having a first outer diameter; and (b) a metallic tube outer conduit having a second outer diameter and covering a substantial portion of the inner conduit, the second outer diameter being larger than the first outer diameter thereby permitting the insertion of the metallic sleeve over the plastic tube, yet with substantially no annular flow channel between the two conduits.

Depending on the equipment available, the polyolefin (e.g., polyethylene) tubing is crosslinked using conventional means known to those skilled in the art (e.g., silane, radiation, etc.). The material is typically crosslinked to at least 60%, with amounts as high as 85% being possible. Cost usually decides which crosslinking method needs to be used to provide a given quality of tubing. The benefit of crosslinking the polyethylene subsequent to the fabrication steps described in the application is that a chemical and/or thermal material bond is formed during the end-forming compression molding processes, resulting in a stronger product. However, there may be applications where this type of end-forming is not essential, thereby permitting the use of previously crosslinked material during the fabrication procedure. Previously crosslinked material has a much better hot melt strength since the crosslinking gives it more structure, and making forming easier. However, the crosslinked material will not chemically bond to itself even when heated to the clear state. This does mean that the material in the formed ends is not completely sealed upon itself, but molded in place with pressure.

Crosslinking can of course, be accomplished in many different ways. Crosslinking can be performed during the extrusion process, e.g., by the Engel process, or post-extrusion, e.g., by a silane process or a peroxide process or combinations thereof wherein some crosslinking occurs during the extrusion step and is completed in a hot bath post-extrusion step. Each process has a crosslinking catalyst that causes the polymer to crosslink when certain temperature and pressure are used. One additional way to crosslink is to use radiation. In this method, extruded tubes are passed under a radiation unit and the exposure causes crosslinking. It usually is more economical to radiate straight tubes since the economics revolve around how many parts will fit on a cart that rolls under the beam. However, this does not represent the only embodiment contemplated within the invention. It is envisioned that under some circumstances, it would be appropriate to crosslink the final product. While the sequencing of the above mentioned processing steps is generally not critical, certain aspects do need to be performed in sequence, e.g., the belling and flaring sequences discussed previously in this application. Depending upon the physical strength and integrity of the final product, the steps of crosslinking, belling, and/or flaring can be effected in any sequence, the only limitation being that the insertion of a nut and/or a copper sleeve and/or a stainless steel overbraid, be effected prior to the completion of both the belling and flaring fabrication processing. A similar limitation would also be present when the tubing work piece is to have two sealing surfaces on opposed ends. The insertion of the nut would need to precede the fabrication of the second sealing end.

Discussion

What has been described is a thermoset rather than a thermoplastic tube which has a much higher heat distortion temperature when compared to standard thermoplastic materials such as polybutylene, polypropylene, polyethylene or PVC. The stress crack resistance is higher as is the dimensional stability. These desirable properties can be achieved by using a lower cost material, in contrast to a more expensive thermoplastic.

Through the processing described above, a superior product can be fabricated at a lower price than that possible using a standard thermoset, which could not have been processed in a similar manner (thermosets cannot be extruded). The invention utilizes thermoplastic processing conditions, with subsequent crosslinking to form a thermoset. This combines the best features of both types of materials: (1) the ease of thermoplastic processing; combined with (2) the desirable physical properties of a thermoset. One of the biggest advantages with the use of crosslinked polyethylene is the fact that it is not notch sensitive, a physical property of large concern when using polybutylene.

Other significant advantages associated with the use of crosslinked polyethylene when compared to polybutylene lie in the fact that crosslinked polyethylene is not a crystalline material. Polybutylene for example requires seven days after extrusion to crystallize and molded ends cannot be formed until this time. It is also very notch sensitive. Crosslinked polyethylene can be formed immediately and is not notch sensitive. The crosslinked polyethylene has a higher heat distortion temperature and since it is at least 60% crosslinked, cannot be used as regrind material. There is a significant memory effect associated with crosslinked polyethylene and the material always goes back to its original shape when it was crosslinked. The PEX can be lower density polyethylene and when crosslinked, will result in a softer, more flexible tube. PEX is also a more forgiving material to fabricate ends with, in that it is possible to form in radii and subsequently fabricate.

Thus, what is shown in this application is that through process modifications, the limitations inherent in polyethylene, polypropylene, and polybutylene have been overcome. Polyethylene is a low cost product that is easy to process, but suffers from low temperature resistance, low burst strength and poor creep resistance. It does have good flexibility. Polypropylene is of moderate cost and also is easy to process. It however, has poor cold weather impact, poor creep resistance, poor burst strength and poor flexibility. Polybutylene is high cost and difficult to process, but has good cold weather impact, good creep, good burst strength, but suffers from poor flexibility and notch sensitivity.

Therefore, what has been described specifically above, can be generalized to be applicable to a process for forming a connector from a hollow tube, wherein the connector has at least one integrally molded end cap at one end of the connector, and a centrally disposed aperture therethrough in one embodiment of the invention. The tubular segment of the end cap will have an internal diameter equal to that of the end cap internal diameter and a wall thickness as measured by a difference between the internal diameter and the outer diameter of the tube. The connector is formed from a uniform thickness hollow cylindrical tube of the same thickness as the tubular segment, using the steps, without regard to order of: (a) molding an end cap on one end of the tube; (b) inserting a metallic sleeve around the tubular segment of the tube; and (c) at least partially crosslinking the tube with a crosslinking agent.

In one specialized embodiment of the invention, the process will further include the step of reducing a diameter of the tube by drawing the tube prior to the step of molding followed by reheating of the tubular segment after the step of inserting the metallic sleeve.

Specifically, the step of molding the end cap will include the steps of: (i) inserting one end of the tube through a female end cap die and having a portion of the tube projecting from the female end cap die, the female end cap die surrounding the outer diameter of the tube, the female end cap die having a projection adapted to cooperate with a recess of a male end cap die; (ii) heating at least a portion of the tube projecting from the female end cap die sufficiently to make such projecting portion pliable enough to form; and (iii) forming the heated portion of the tube into an end cap by insertion of the projecting portion of the tube into the male end cap die and closing the male and female end cap dies. In one aspect of the processing, the tube will be at least partially placed on an elongated male die end cap projection with the projection closely conforming to the internal diameter of the tube.

Generally, at least one fastening means will be inserted onto the tube, the fastening means having an aperture disposed centrally therein, the aperture adapted so as to permit insertion over the outer diameter of the tubular segment, yet smaller than an outer diameter of the shoulder of the end cap, the fastening means further having a threaded end, the threaded end being adapted for sealing engagement over the molded end wherein the sealing means is selected from the group consisting of a radiused sealing means and a conical sealing means while in another embodiment, the invention encompasses the insertion of a separate sealing means which is softer than the connector over the end face of the cap so as to form a nose cone.

In a preferred embodiment, the composition of the tube is polyethylene and molding temperatures of about 700° F. for about 15–35 seconds are employed. Optionally, the process may include an additional step of cooling the connector is used after the step of forming the heated portion of the tube into the end cap. Generally, the heated portion of the tube is pushed into the male end cap die under melt flow conditions so as to uniformly fill the male end cap die.

As stated previously, depending upon the physical characteristics of the final product, the step of crosslinking may be the first step or the last step. The crosslinking is effected by a crosslinking process, said process being selected from the group consisting of an Engel process, a silane process, a peroxide process and an irradiation process.

In another embodiment of the invention, the process will include the step of inserting two fastening means onto the tubular segment of the connector after the step of molding the end cap and before molding a second end cap on an opposed end of the tube.

In yet another embodiment of the invention, the process will encompass the formation of a belled end on the tube, either alone, or positioned at an opposed end of the tube from that of the end cap, the opposed belled end having a larger belled internal diameter and a larger belled outer diameter in comparison to the internal diameter and outer diameter of the tube.

When the belling process is undertaken in association with the formation of an end cap, the process will include inserting at least one fastening means onto the tubular segment. The belled end will be formed by using the steps which include: inserting an end of the tube through a female belling die and having a portion of the tube projecting from the female belling die, the female belling die surrounding the outer diameter of the tube and having a projection adapted to cooperate with a recess of a male belling die; heating at least a portion of the tube projecting from the female belling die sufficiently to make such projecting portion pliable enough to form; and belling one end of the tube by insertion of the projecting tube into an annular recess of the male belling die and closing the male and female belling dies and wherein the belled end of the tube has at least the same thickness as that of the tube. The process may further include the step of placing the opposed end of the tube at least partially on an elongated male belling die projection of the male belling die with the projection closely conforming to the internal diameter of the tube. An additional step of cooling the belled end of the connector may occur after the step of belling. It is desirable to include the step of physically pushing the heated portion of the tubular connector into the male belling die under melt flow conditions so as to uniformly fill the male belling die as well as including the step of cooling at least one of the belling dies after they are brought together.

In yet another aspect of the invention, the process will not involve an end cap formation, in which case the process will be for forming at least one belled tubular end without wall thinning from a constant thickness portion of a hollow cylindrical tube comprising the steps which have been discussed previously with the belling procedure.

By working with a medium to high density polyethylene, which is of low cost, easy processing, good flexibility, but marginal cold impact and poor burst, and crosslinking the material to over 65%, the resulting product possesses good creep, good flexibility, good burst strength, good cold weather impact, significantly lower cost than polybutylene, and with a higher heat distortion temperature with a longer life expectancy than polybutylene. The key with forming the ends resides in the processing which occurs when the material is crosslinked, since it becomes a thermoset as opposed to a thermoplastic when it was extruded. In order to overcome this limitation, the molding temperatures were increased due to higher processing temperature, pressure was added because material must be formed over itself, which is pliable, but which does not stick to itself. When the material is crosslinked to 65%, only 35% remains to bond. Scrap is not reprocessable, so operations must be more exact, and the tubing must be constantly checked to be sure that the crosslinking has taken place. The amount of pressure is dependent upon the material which is being processed, the exact number of pounds pressure being varied until the molded product uniformly fills the mold.

One of the significant benefits of utilizing this technology is that an all plastic waterway is made which eliminates any possibility of water contamination due to extraction of any components which may be leachable from the copper tube. Additionally, some of the additional problems potentially present due to electrolysis are eliminated in that the connection is through plastic and not metal-to-metal.

Since the plastic tube is the primary conduit, and the walls of the plastic tube are designed to be of sufficient thickness to meet all applicable standards for pressure, this thickness prevents the ability of an installer to "crimp" the plastic tube when bending it into a tight radius. It is this same design feature which allows the tubing to be encased with a thin walled copper tube (0.008" to 0.020") in comparison to more traditional thicker copper tubing (0.025"), as well as permitting the shaping of the tubing without using a bending tool. Traditional copper risers (0.025" in wall thickness) are very difficult to bend without collapsing a part of the tubing. These plastic lined risers of the present invention are easy to bend into tight radii by hand without the need for a tubing bender.

Another benefit of the plastic lined risers is that they can be re-bent in many instances when mistakes are made during the installation bending processes. This is typically not possible when using standard copper risers. Once bent into shape, the plastic lined risers are held into shape by the thin walled copper, thereby giving the final result a "structured" look rather than a "random" one.

While crosslinked polyethylene is the preferred polymer for use in this invention, there is no need to limit the application to such. In fact, any flexible polymer conduit is acceptable. While in a preferred embodiment, the thickness of the plastic tube will be sufficient in and of itself to meet appropriate pressure criteria, it is possible to go to thinner dimensions provided that the combination of the thin walled copper sleeve plus the polymer meet the criteria in combination. When the product is used in this mode, however, the ability of the polymer waterway to completely resist all "kinking" when tightly radiused, may be compromised to some degree.

The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for forming a connector from a hollow tube, said connector comprising at least one integrally molded end cap at one end of the connector, said end cap having an aperture therethrough and having an end cap internal diameter, and a tubular segment having a tubular segment internal diameter equal to that of the end cap internal diameter and a tubular segment outer diameter, said tubular segment having a thickness as measured by a difference between the internal diameter and the outer diameter of the tubular segment, the tubular segment originating from the end cap, the connector being formed from a uniform thickness hollow cylindrical tube of the same thickness as the tubular segment, comprising the steps, without regard to order of:

(A) molding an end cap on one end of a hollow tube;
(B) inserting a metallic sleeve around the tubular segment of the hollow tube; and
(C) at least partially crosslinking the hollow tube with a crosslinking agent.

2. The process of claim 1 which further comprises the step of
reducing a diameter of the tube by drawing the tube prior to the step of molding.

3. The process of claim 2 which further comprises the step of
reheating the tubular segment after the step of inserting the metallic sleeve.

4. The process of claim 1 wherein the step of molding the end cap further comprises the steps of:

(i) inserting one end of the tube through a female end cap die and having a portion of the tube projecting from the female end cap die, the female end cap die surrounding the outer diameter of the tube, the female end cap die having a projection adapted to cooperate with a recess of a male end cap die;
(ii) heating at least a portion of the tube projecting from the female end cap die sufficiently to make such projecting portion pliable enough to form; and
(iii) forming the heated portion of the tube into an end cap by insertion of the projecting portion of the tube into the male end cap die and closing the male and female end cap dies, the end cap further comprising:
end face, a sealing means and a flange having a shoulder and further having a centrally disposed aperture therethrough.

5. The process of claim 4 which further comprises the step of
at least partially placing the one end of the tube on an elongated male die end cap projection with the projection closely conforming to the internal diameter of the tube.

6. The process of claim 4 wherein the sealing means is selected from the group consisting of a radiused sealing means and a conical sealing means.

7. The process of claim 4 wherein
the tube is polyethylene and a temperature of the step of heating is about 700° F. for about 15–35 seconds.

8. The process of claim 7 which further comprises
an additional step of cooling the tube after the step of forming the heated portion of the tube into the end cap.

9. The process of claim 4 which further comprises
a step of physically pushing the heated portion of the tube into the male end cap die under melt flow conditions so as to uniformly fill the male end cap die.

10. The process of claim 4 which further comprises
the step of inserting two fastening means onto the tubular segment of the tube after the step of molding the end cap and before molding a second end cap on an opposed end of the tube, the fastening means having an aperture disposed centrally therein, the aperture adapted so as to permit insertion over the outer diameter of the tubular segment, yet smaller than an outer diameter of the shoulder of the end cap, the fastening means further comprising a threaded end, the threaded end being adapted for sealing engagement over the molded ends.

11. The process of claim 10 wherein
the sealing means is selected from the group consisting of a radiused sealing means and a conical sealing means.

12. The process of claim 10 which further comprises
the insertion of a separate sealing means which is softer than the tube over the end face of the end cap so as to form a nose cone.

13. The process of claim 10 wherein
the tube is polyethylene and
a temperature of the step of heating is about 700° F. for about 15–35 seconds.

14. The process of claim 13 which further comprises
an additional step of cooling the tube after the step of forming the heated portion of the tube into an end cap.

15. The process of claim 13 which further comprises
a step of physically pushing the heated portion of the tube into the male end cap die under melt flow conditions so as to uniformly fill the male die.

16. The product of the process of claim 10.

17. The process of claim 1 which further comprises
inserting at least one fastening means onto the tube, the fastening means having an aperture disposed centrally therein, the aperture adapted so as to permit insertion over the outer diameter of the tubular segment, yet smaller than an outer diameter of a shoulder of the end cap, the fastening means further comprising a threaded end, the threaded end being adapted for sealing engagement over the molded end.

18. The process of claim 1 which further comprises the insertion of a separate sealing means which is softer than the tube over the end face of the cap so as to form a nose cone.

19. The process of claim 1 wherein
the step of crosslinking is the first step.
20. The process of claim 1 wherein
the step of crosslinking is the last step.
21. The process of claim 1 wherein
the step of at least partially crosslinking is effected by a crosslinking process, said process being selected from the group consisting of an Engel process, a silane process, a peroxide process and an irradiation process.
22. The product of the process of claim 1.
23. The process of claim 1 which further comprises
forming a belled end on the tube, said belled end at an opposed end of the tube from that of the end cap, said opposed belled end having a larger belled internal diameter and a larger belled outer diameter in comparison to the internal diameter and outer diameter of the tube, a thickness of the belled end being at least the same thickness as the tubular segment, and a fastening means having an aperture disposed centrally therein, the aperture adapted so as to permit insertion over the outer diameter of the tubular segment, yet smaller than an outer diameter of a shoulder of the end cap and the outer diameter of the belled end, by:
   (i) inserting at least one fastening means onto the tubular segment, the fastening means having all aperture disposed centrally therein, the aperture adapted so as to permit insertion over the outer diameter of the tubular segment, yet smaller than an outer diameter of the shoulder of the end cap, the fastening means further comprising a threaded end, the threaded end being adapted for sealing engagement over the molded end;
   (ii) inserting the opposed end of the tube through a female belling die and having a portion of the tube projecting from the female belling die, the female belling die surrounding the outer diameter of the tube and having a projection adapted to cooperate with a recess of a male belling die;
   (iii) heating at least a portion of the tube projecting from the female belling die sufficiently to make such projecting portion pliable enough to form; and
   (iv) belling one end of the tube by insertion of the projecting tube into an annular recess of the male belling die and closing the male and female belling dies and wherein the belled end of the tube has at least the same thickness as that of the tube.
24. The process of claim 23 which further comprises the step of
placing the opposed end of the tube at least partially on an elongated male belling die projection of the male belling die with the projection closely conforming to the internal diameter of the tube, the male belling die having an annular-shaped recess which increases from the internal diameter of the tube to the internal diameter of the belled end and correspondingly increases from the outer diameter of the tube to the outer diameter of the belled end so as to maintain at least the same thickness of the tube at the belled end as in the tubular segment.
25. The process of claim 23 which further comprises
the additional step of cooling the belled end of the tube after the step of belling.
26. The process of claim 23 which further comprises
the step of physically pushing the heated portion of the tube into the male belling die under melt flow conditions so as to uniformly fill the male belling die.
27. The process of claim 23 which further includes
the step of cooling at least one of the belling dies after they are brought together.
28. The process of claim 23 wherein
the tube is polyethylene and
the temperature of the step of heating is about 700° F. for about 15–35 seconds.
29. The product of the process of claim 23.
30. A process for forming at least one belled tubular end without wall thinning from a constant thickness portion of a hollow cylindrical tube comprising the steps, without regard to order of:
   (a) molding a belled end on one end of the tube;
   (b) inserting a metallic sleeve around the tube; and
   (c) crosslinking the tube with a crosslinking agent.
31. The process of claim 30 which further comprises the step of
reducing a diameter of the tube by drawing the tube.
32. The process of claim 31 which further comprises the step of
reheating the tube after the step of inserting the metallic sleeve.
33. The process of claim 30 wherein the step of molding a belled end further comprises the steps of:
   (i) inserting the tube through a female belling die and having a portion of the tube projecting from the female belling die, the female belling die surrounding the outer diameter of the tube and having a projection adapted to cooperate with a recess of a male belling die;
   (ii) heating at least a portion of the tube projecting from the female belling die sufficiently to make such projecting portion pliable enough to form; and
   (iii) belling one end of the tube by insertion of the projecting tube into an annular recess of the male belling die and the cooperating recess of the male belling die and the projection of the female belling die by closing the male and female belling dies.
34. The process of claim 33 which further comprises the step of
placing an end of the tube, at least partially on an elongated male die projection of the male belling die with the projection closely conforming to the internal diameter of the tube, the male belling die including an annulus-shaped recess which increases from the internal diameter of the tube to an internal diameter of the belled end and correspondingly increases from the outer diameter of the tube to an outer diameter of the belled end so as to maintain at least the thickness of the belled end of the tube to that of the tubular segment.
35. The process of claim 33 wherein
the tube is polyethylene and
the temperature of the step of heating is from about 700° F. for about 15–35 seconds.
36. The process of claim 33 which further comprises
an additional step of cooling the tube after the step of belling one end of the tube.
37. The process of claim 33 which further comprises
the step of physically pushing the heated portion of the tube into the male belling die under melt flow conditions so as to uniformly fill the die.
38. The process of claim 33 which further comprises
a step of cooling at least one of the belling dies after they are brought together.
39. The product of the process of claim 30.
40. A process for the preparation of the plastic tube which is encased by a metallic sleeve comprising the steps of:

heating an extruded polyolefin tube to a first temperature sufficient to enable the tube to be reduced in outer diameter;

reducing an outer diameter of the tube from a first diameter to a second smaller diameter;

inserting a metallic sleeve which has an internal diameter which is greater than the second diameter of the tube over at least a portion of the tube; and reheating at least a portion of the tube to a second temperature sufficient to cause the tube to expand from the second diameter to the inner diameter of the metallic sleeve to reduce any annular flow that may occur between the tube and metallic sleeve.

41. The process of claim 40 which further comprises the step of inserting a compression fitting over at least one end of the metallic sleeve.

42. The process of claim 41 wherein the compression fitting is a ferrule.

43. The process of claim 40 wherein the polyolefin is polyethylene and the first and the second temperature is from about 270° F. to 320° F.

44. The process of claim 43 wherein the first and the second temperature is from about 280° F. to 300° F.

* * * * *